US008260546B2

(12) United States Patent
Soelberg

(10) Patent No.: US 8,260,546 B2
(45) Date of Patent: Sep. 4, 2012

(54) SYSTEMS AND METHODS FOR PROVIDING GEOGRAPHICAL INFORMATION TO A MOBILE COMMUNICATIONS DEVICE

(75) Inventor: Emily Soelberg, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 449 days.

(21) Appl. No.: 12/637,320

(22) Filed: Dec. 14, 2009

(65) Prior Publication Data

US 2011/0144899 A1    Jun. 16, 2011

(51) Int. Cl.
*G01C 21/00* (2006.01)
*G06F 19/00* (2006.01)
(52) U.S. Cl. ............ 701/410; 701/451; 455/456.3; 340/995.23
(58) Field of Classification Search .......... 701/410, 701/413, 420, 421, 451, 454; 455/456.1, 455/230, 456.3; 340/995.23, 989
See application file for complete search history.

(56) References Cited

U.S. PATENT DOCUMENTS

| | | | |
|---|---|---|---|
| 6,336,073 B1* | 1/2002 | Ihara et al. ............ | 701/533 |
| 6,522,888 B1* | 2/2003 | Garceran et al. ........ | 455/456.3 |
| 7,113,753 B2* | 9/2006 | Cotanis ................. | 455/115.1 |
| 7,333,794 B2 | 2/2008 | Zappala | |
| 7,535,849 B2 | 5/2009 | Laiho et al. | |
| 7,587,208 B2 | 9/2009 | Sharma et al. | |
| 7,610,151 B2 | 10/2009 | Letchner et al. | |
| 2006/0142939 A1* | 6/2006 | Muramatsu ............. | 701/209 |
| 2009/0182500 A1 | 7/2009 | Dicke | |

OTHER PUBLICATIONS

Spime Onboard-Hybrid LBS Map and Navigation Engine, "www.geoconnexion.com", Sep. 30, 2009.
Quain, John R., "Getting Lost With a Cellphone", www.nytimes.com, Sep. 17, 2009.
TeleNav GPS Navigator (AT&T), "http://reviews.cnet.com", Dec. 4, 2006.
TeleNav v4.x—GPS Navigation Suite for Research in Motion®—User's Guide, TeleNav Jun. 2003.
On-Deck Location Based Apps—Customer Reviews 2009, Skyhook Wireless.
AT&T Navigator—iPhone App Reviews, "www.iphoneappreviews.net", Jun. 27, 2009.
Bohn, Dieter, "Eyes on: Sygic Turn by Turn GPS App for iPhone", www.theiphoneblog.com, Feb. 18, 2009.
Getting lost with a cell phone, "www.infotech.indiatimes.com", Sep. 21, 2009 (New York Times).
Navigon Mobile Navigator for iPhone—GPS Review, "www.gpsreview.net".

* cited by examiner

*Primary Examiner* — Tan Q Nguyen
(74) *Attorney, Agent, or Firm* — Parks IP Law LLC; Mickki D. Murray, Esq.

(57) ABSTRACT

A system for providing a tailored route to a mobile communications device over a wireless communications network. The system includes a map server including a processor and a memory storing instructions executable by the processor to make the map server operable to prepare a basic route from a route origin to a route destination and obtain information regarding characteristics of the wireless communications network along the basic route. The processor is further made operable to prepare the tailored route using the basic route and the network characteristics information and provide the tailored route to the mobile communications device over the wireless communications network.

20 Claims, 5 Drawing Sheets

SYSTEMS AND METHODS FOR PROVIDING GEOGRAPHICAL INFORMATION TO A MOBILE COMMUNICATIONS DEVICE

TECHNICAL FIELD

The present disclosure relates generally to providing geographical information to a mobile communications device operating on a wireless communications network and, more particularly, to systems and methods for providing the geographical information based on performance characteristics of the wireless communications network along a planned travel route.

BACKGROUND

Mobile communications devices such as cellular phones, personal digital assistants (PDA), or so-called smart phones have become commonplace. Applications and service offerings beyond those related to conventional calling, e-mail, and Internet access have increased rapidly in recent years. A specific area of significant development has been location-based services, by which information or functions are provided to the mobile communications device depending on its geographical location.

Navigation services typically involve the mobile communications device displaying a location of the mobile communications device on a map. Users can also request a route from a desired starting location, such as a present location or user supplied location, to a desired destination. Turn-by-turn directions can be provided in textual, visual (e.g., map), or audible format in real-time while the device travels along the route.

For providing navigational services, map applications on mobile communications devices can access either onboard maps or parts of offboard maps. Onboard maps are comprehensive maps stored locally on the mobile communications device, beyond any snippets of maps stored in a cache (e.g., RAM) of the device. Onboard maps cover an area, such as a state, country, or continent. Onboard maps covering even a relatively small region, such as a large city and its metropolitan area, require a relatively large amount of data for mobile communications devices to store. For example, a current comprehensive map of the United States can require up to 2 or 3 GB of memory, taking up to ten, twenty or even twenty-five percent of the storage capacity of some devices. Because of this, onboard maps are most commonly used with dedicated navigation devices. Another shortcoming of using onboard maps is that they become more and more out-of-date with time, requiring regular and sometimes-large or time-consuming updating downloads.

Offboard maps are stored remote to the mobile communications device by a map service. A portion of the map is downloaded to the mobile communications device as needed, such as in response to a request by the user for routing to a desired destination. The amount of map data downloaded is much less than the amount of data stored for onboard systems. And because the downloaded map data is only needed for the task at hand (e.g., routing to a present destination), the data does not need to be kept on the device after the task is completed. Another benefit of offboard maps is that the most up-to-date map data is available for the user because the map service regularly updates the remotely-stored maps that are downloaded to the device when needed.

A drawback of using offboard maps is dependence on coverage and bandwidth of the wireless communications network. If a user moves into an area lacking coverage or sufficient available bandwidth, additional map data cannot be sent to the device over the network.

SUMMARY

The present disclosure relates to systems and methods for providing geolocation information to a mobile communications device. The system includes a map server including a processor and a memory storing instructions executable by the processor to make the map server operable to prepare a basic route from a route origin to a route destination and obtain information regarding characteristics of the wireless communications network along the basic route. The processor is further made operable to prepare the tailored route using the basic route and the network characteristics information and provide the tailored route to the mobile communications device over the wireless communications network.

In one embodiment, the instructions are executable by the processor to make the map server further operable to receive a request from the mobile communications device by way of the wireless communications network, and prepare the tailored route in response to the map server receiving the request from the mobile communications device.

The system, in some embodiments, includes, an evaluation server configured to analyze the wireless communications network and prepare data regarding conditions of the network. The instructions, in being executable by the processor to make the map server operable to obtain information regarding characteristics of the wireless communications network along the basic route, are executable by the processor to make the map server operable to obtain at least some of the information from the data prepared by the evaluation server.

In some embodiments the instructions make the processor of the map server operable to provide the tailored route to the mobile communications device in a format enabling the mobile communications device to render the tailored route to a user of the mobile communications device as textual directions and/or as audible directions.

The instructions, in some embodiments, make the processor of the map server operable to (i) identify multiple parts of the tailored route to be provided separately, (ii) identify a condition precedent to sending a subsequent part of the multiple parts of the tailored route to the mobile communications device, (iii) provide an initial part of the multiple parts of the tailored route to the mobile communications device, (iv) determine that the condition precedent has been met; and (v) provide the subsequent part of the tailored route to the mobile communications device in response to determining that the condition precedent has been met.

In some embodiments, the instructions make the processor of the map operable to, in being executable by the processor to make the map server operable to identify the condition precedent to sending the subsequent part of the tailored route to the mobile communications device, identify the condition. The condition is, in some embodiments, the mobile communications device moving into a subsequent portion of the wireless communications network having or expected to have better network coverage and/or better load characteristics than an initial portion of the wireless communications network in which the mobile communications device is positioned when the initial part of the tailored route is provided to the mobile communications device.

In some embodiments, the instructions, in being executable by the processor to make the map server operable to prepare the basic route from the origin to the destination, are executable by the processor to make the map server operable to prepare a strict route including only a path of the basic route.

The instructions, in being executable by the processor to make the map server operable to prepare the basic route from the origin to the destination in some embodiments, are executable by the processor to make the map server operable to prepare the strict route and first level extra map data adjacent the strict route to accommodate potential re-routing in the event of a detour from the strict route by the mobile communications device.

In some embodiments, the instructions, in being executable by the processor to make the map server operable to prepare the tailored route, are executable by the processor to make the map server operable to (i) determine an amount of second level extra map data to add to the first level extra map data of the basic route adjacent a portion of the route determined to be weak; and/or (ii) determine an amount by which to reduce the first level extra map data of the basic route adjacent a portion of the route determined to be strong.

The instructions, in some embodiments, in being executable by the processor to make the map server operable to prepare the basic route, are executable by the processor to make the map server operable to categorize each section of multiple sections of the basic route into one of a plurality of categories based on characteristics of the wireless communications network associated with the section. In these embodiments, the instructions, in being executable by the processor to make the map server operable to prepare the tailored route, are executable by the processor to make the map server operable to prepare the tailored route to include more or less map data in places based on results of the categorizing by the map server processor.

In another aspect, the present disclosure relates to a method for providing a tailored route to a mobile communications device over a wireless communications network using a system including a map server, the method including (1) the map server preparing a basic route from a route origin to a route destination, (2) the map server obtaining information regarding characteristics of the wireless communications network along the basic route, (3) the map server preparing the tailored route using the basic route and the network characteristics information, and (4) the map server providing the tailored route to the mobile communications device over the wireless communications network.

In one embodiment, the map server receives a request from the mobile communications device by way of the wireless communications network, and prepares the tailored route in response to the map server receiving the request from the mobile communications device.

In some embodiments, the system includes an evaluation server and the method includes the evaluation server analyzing the wireless communications network and preparing data regarding conditions of the wireless communications network, wherein the map server obtains at least some of the information regarding characteristics of the wireless communications network from the data prepared by the evaluation server.

The method, in some embodiments, includes the map server, in providing the tailored route to the mobile communications device over the wireless communications network, provides the tailored route to the mobile communications device in a format enabling the mobile communications device to present the tailored route to a user of the mobile communications device as textual directions and/or as audible directions.

In some embodiments, the map server providing the tailored route to the mobile communications device includes (1) identifying multiple parts of the tailored route to be provided separately, (2) identifying a condition precedent to sending a subsequent part of the multiple parts of the tailored route to the mobile communications device, (3) providing an initial part of the multiple parts of the tailored route to the mobile communications device, (4) determining that the condition precedent has been met, and (5) providing the subsequent part of the tailored route to the mobile communications device in response to determining that the condition precedent has been met.

The method, in some embodiments includes the condition precedent being the mobile communications device moving into a portion of the wireless communications network having or expected to have better network coverage and/or load characteristics than a portion of the wireless communications network in which the mobile communications device was in when the initial part of the tailored route was provided to the mobile communications device.

In some embodiments, the map server, in preparing the basic route from the origin to the destination, prepares a strict route including only the path of the basic route.

In some embodiments, the map server, in preparing the basic route from the origin to the destination, prepares the strict route and first level extra map data adjacent the strict route to accommodate potential re-routing in the event of a detour from the strict route by the mobile communications device.

In some embodiments, the map server, in preparing the tailored route (1) determines an amount of second level route data to add to the first level extra map data of the basic route adjacent a portion of the route determined to be weak and/or (2) determines an amount by which to reduce the first level extra map data of the basic route adjacent a portion of the route determined to be strong.

In some embodiments, the map server, in preparing the basic route, categorizes each section of multiple sections of the basic route into one of a plurality of categories based on characteristics of the wireless communications network associated with the section. The map server, in preparing the tailored route, prepares the tailored route to include more or less map data in places based on results of the categorizing by the map server in the preparing step.

Other aspects of the present invention will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, handheld computing devices, microprocessor-based, programmable consumer electronics, combinations thereof, and the like.

General Overview

Systems and methods of the present disclosure enable provisioning of tailored geographical information to mobile communications devices via a wireless communications network depending on a planned route for the device. In some embodiments, the geographical information takes the form of map or route data, such as directions in map, text, and/or audible form. Basic geographical information (e.g., route data) is tailored based on characteristics of the wireless communications network, such as load or coverage. The geographical information is in some embodiments tailored based on user characteristics, such as preferences, actions, or habits (e.g., common time of day of travel, driving speed, etc.), and/or habits or actions of other users (e.g., traffic patterns, common wrong turns).

Wireless Communications Network

Figure 1:
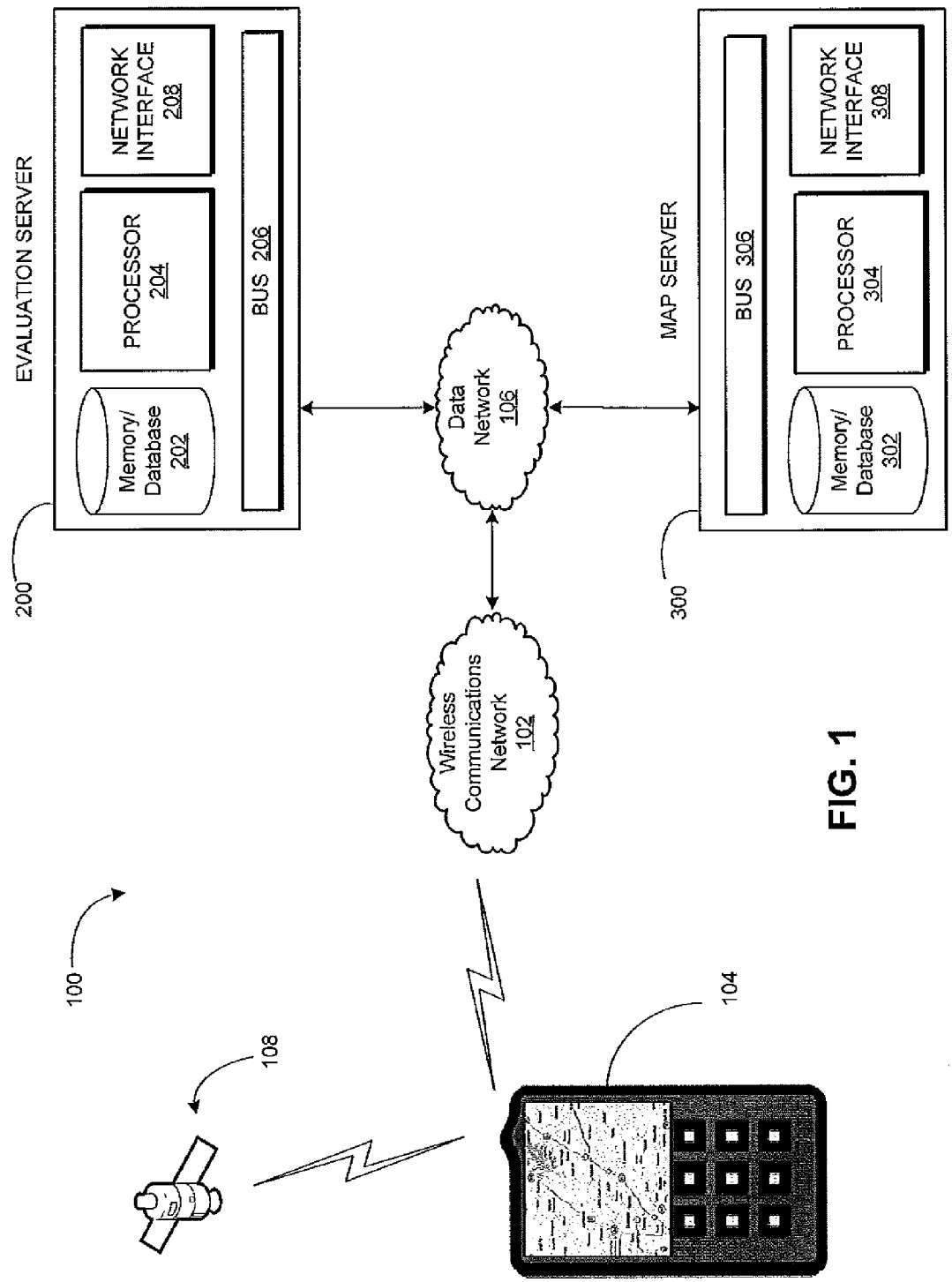
FIG. 1 illustrates an exemplary system for providing geographical information to mobile communications devices, according to an embodiment of the present disclosure.

Referring to the figures, and more particularly to FIG. 1, a system for providing geographical information to a mobile communications device according to an embodiment of the present disclosure is designated in its entirety by reference number 100. The system 100 may include a generally conventional wireless communications network 102 for providing voice and data service to mobile communications devices 104.

In some embodiments, the wireless communications network 102 includes a cellular network, a packet data network, for example, the Internet (Internet), a circuit switched network, for example, a publicly switched telephone network (PSTN), other networks, combinations thereof, and the like. In the described exemplary embodiments, the wireless communications network 102 is described as a cellular network, though alternative and/or additional networks are contemplated.

The cellular network includes components such as, but not limited to, base transceiver stations (BTS's), Node-B's, Personal Communications Services (PCS) station, other base stations or cell sites, base station controllers (BSC's), radio network controllers (RNC's), mobile switching centers (MSC's), short message service centers (SMSC's), multimedia messaging service centers (MMSC's), home location registers (HLR's), visitor location registers (VLR's), charging platforms, billing platforms, voicemail platforms, GPRS core network components, location service nodes, Internet protocol multimedia subsystem (IMS) components, other nodes and components, and the like. The cellular network also includes radios and nodes for receiving and transmitting voice, data, and combinations thereof to and from radio transceivers, networks, and the Internet.

In some embodiments, the cellular network is configured as a 2G GSM (Global System for Mobile communications) network, and provides data communications via GPRS (General Packet Radio Service) and EDGE (Enhanced Data rates for GSM Evolution). In some embodiments, the cellular network is configured as a 3G UMTS (Universal Mobile Telecommunications System) network and provides data communications via the HSPA (High-Speed Packet Access) protocol family, for example, HSDPA (High-Speed Downlink Packet Access), EUL (Enhanced Uplink) or otherwise termed HSUPA (High-Speed Uplink Packet Access), and HSPA+ (Evolved HSPA). The cellular network is also compatible with future mobile communications standards including, but not limited to, pre-4G, LTE (Long Term Evolution), and 4G, for example.

It should be appreciated that in some embodiments substantially all of the functionality described with reference to the wireless communications network 102 is performed by a cellular network alone, or in combination with other networks, network elements, and the like, and that some elements are not illustrated. While the wireless communications network 102 will be described herein as a cellular network, it should be understood that other networks are possible and are contemplated.

The wireless communications network 102, in some embodiments includes an applications gateway (AG) (not shown) for mediating and optimizing data flow, such as downloading of information (e.g., map data) between system servers (e.g., a map server) and applications (e.g., map application) onboard mobile communications devices 104. The AG mediates and optimizes data flow by, for example performing various encodings, mappings, compressions optimizations or other operations or transformations of data.

Data Network

The system 100 further includes a wireless network evaluation server 200 communicating with the wireless communications network 102 by way of a data network 106. The wireless network evaluation server 200 is configured to analyze performance characteristics of the wireless network, such as coverage and load. The system 100 also includes a map server 300 communicating with the wireless communications network 102 by way of the data network 106. The map server 300 stores and updates map data, and sends the updated map data to mobile communications devices 104 by way of the wireless network 102, as described in more detail below.

In the illustrated embodiment, the wireless network evaluation server 200 is a combination of hardware and software. As shown in FIG. 1, the evaluation server 200 includes one or more memory modules 202 that are operatively linked and in communication with one or more processors 204 via one or more data/memory busses 206. The illustrated evaluation server 200 also includes a network interface 208 for facilitating communication with mobile communications devices 104. While the evaluation server 200 is illustrated as a single component in FIG. 1, in some embodiments the evaluation server includes two or more servers. The various servers of the evaluation server 200 are in some embodiments co-located, in some embodiments remote to one another, and in some embodiments some servers are co-located while one or more others are remote.

The term memory, as used herein to describe the memory 202, collectively includes all memory types associated with the evaluation server 200. Examples of memory types include, but are not limited to, processor registers, processor cache, random access memory (RAM), other volatile memory forms, and non-volatile, semi-permanent or permanent memory types. Examples of non-volatile memory types include, but are not limited to, tape-based media, optical disc media, solid state media, hard disks, storage arrays, database structures, combinations thereof, and the like. While the memory 202 is illustrated as residing proximate the processor 204, it should be understood that the memory 202 can be a remotely accessed storage system, such as, a local server, an Internet server, a remote hard disk drive, a removable storage medium, a network storage device, combinations thereof, and the like. Any of the data, applications, and/or software described below in connection with the evaluation server 200 can be stored within the memory 202, as illustrated, and/or accessed via network connections to other data processing systems. Accordingly, in some embodiments of the present disclosure, the evaluation server 200 is configured as a server to one or more client data processing systems, such as the mobile communications device 104, as dictated by a client/server model, for example.

The processor 204 of the evaluation server 200 is configured to receive and/or formulate performance information relating to performance characteristics of the wireless communications network 102, by way of the network interface 208. The processor 204 is further configured to store the performance information in the memory 202. As provided above, in some embodiments the memory 202 includes one or more databases that the processor 204 of the evaluation server 200 can access to store and/or retrieve data. It will be appreciated that in some embodiments the evaluation server 200 and/or the storage functions are distributed amongst a plurality of servers and/or storage functions, respectively. Such combined operations are in some embodiments facilitated by way of, for example, a load distributing server (not illustrated).

Network Performance Analysis

Performance characteristics of the wireless communications network 102 may be collected in a variety of ways. One way of collecting network performance data involves retrieving data collected and/or generated at network nodes in the wireless communications network 102, such as base stations, control stations, or switches (e.g., MSCs). For example, in some embodiments, the switches include statistics software configured to receive and collect the data from, for example, (i) signal traffic data through the node, (ii) activity of the node, such as data about dropped calls, and (iii) messages received from mobile communications devices or otherwise from users regarding system performance, such as regarding signal loss. Such messages may report, for example, low reception quality, poor source quality, dropped calls, loss data connections, etc., and be transmitted by, for example, phone calls, e-mails, and SMS messages to the evaluation server 200 or customer service. Several vendors sell software products that analyze wireless network performance and display results to system engineers. Some of these products also make suggestions regarding network design.

Information obtained from the nodes may include information about the performance of particular nodes, such as BTSs, BSCs, and MSCs. The information may also correspond to specific sectors, areas, or cells, control channels, traffic channels, longitude and latitude coordinates, cell polygons, dates and/or times, random or certain groups of mobile communications devices, such as identified by phone numbers, and any other network criteria or metric of interest.

Another way of collecting network performance data is known as drive testing. In drive testing, testing vehicles (e.g., cars or trucks) are configured with cellular devices and deployed throughout an area, such as a metropolitan area. Each testing vehicle includes a locating component, such as GPS in the cellular device, and establishes voice and/or data wireless connections to the network. The vehicle perceives network characteristics, such as signal strength and lost connections, and records network characteristics data in connection with associated location data, before transmitting the data to the node for further processing and analysis.

In yet another approach, mobile communications devices, actual subscriber units or test units, are equipped with performance monitoring software that responds to requests for performance information from a node, such as MSC, which is equipped with corresponding software. A system engineer formulates a query or request for information to be sent to the mobile communications devices. Requests may target mobile communications devices based on any one or more of a combination of variables. Requests can specify the data being requested and target select mobile communications devices, devices in select geographical areas, and/or select time periods. Mobile units implicated by the query respond by sending performance data or call data with associated location data to the node. The performance data are processed and analyzed (with delay or in real-time) to give a representation of network performance from the subscriber's point of view. This approach is described in more detail in U.S. Pat. No. 7,333,794, which is incorporated herein by reference.

Methods of collecting network performance data is not limited to the ways provided above. The disclosed methods of collecting network performance data may be combined or merged with each other and/or with other ways of collecting network performance characteristics.

In some embodiments, the evaluation server 200 retrieves network performance data for analysis and processing from network nodes, such as BSCs, BTSs, MSCs, and mobile communications devices operating in the network.

Geo-Information Overview

In conventional systems for providing mapping or other geographical information to a mobile communications device 104, the device includes a geo-information application such as map application. The geo-information application is configured to prepare a request for the information and facilitate transmission of the request from the device 104. The geo-information application is further configured to receive and process an incoming response to the transmitted request for implementation on the device 104, such as presentation to the user of the device. The request may include additional information, such as information personal to the device or user. For example, the request may include location information generated by a location component of the mobile communications device 104 (e.g., GPS) and user information, such as preferences for geo-information (e.g., preferences for presentation of mapping information). In some embodiments, the request may be generated by an application of the mobile communications device seeking routing information or another location-based service (LBS).

While the present disclosure primarily describes requests from mobile communications devices for map data, and the preparation of requested map data for delivery to the mobile communications device, the description is merely exemplary and applies equally to requests, preparation, and delivery of other types of geo-information. For example, the system components and functions described herein with respect to mapping can be applied to other location-based services, such as providing text or voice directions, whether a map, per se, needs to be generated or downloaded to the device to satisfy the request. Accordingly, though the serving node or component primarily referred to as a map server herein, it should be appreciated that the map server 300 is in some embodiments a geo-information server providing any one or more of a variety of functions. For example, the map server 300 in some embodiments provides routing data as a routing information server (RIS).

Moreover, the disclosure is not limited to generating and providing routing information, and the descriptions herein can be used in connection with location-based services other than routing. For example, the system components and functions described herein for determining an amount of geo-information to provide, and a timing of provision, can be applied to delivery of other location related information in situations when a user is expected to move (e.g., within a cell or from one wireless cell to another) while using the service. Contemplated services to which the present disclosure can be applied include, but are not limited to, (i) providing information regarding various points of interest (POI), (ii) providing information regarding certain people, such as location of friends or people in a group, (iii) providing location-specific alerts or notices, such as regarding local discount sales on services or products (e.g., gasoline, oil change, restaurants), (iv) providing traffic information, (v) providing weather information, and (vi) providing advertising information.

Although the present description of providing geo-information to mobile communications devices primarily includes a user requesting the information from system components (known as a "pull" arrangement, wherein the mobile communications device requests, or pulls the information), it should be appreciated that in some embodiments the system components provide geo-information in accordance with the present disclosure without being directly prompted by the mobile communications device (i.e., a "push" arrangement, wherein components push information to the mobile communications device).

A processor of the mobile communications device 104, working through a map application of the device, transmits the request for geo-information such as mapping information to the wireless network 102 by way of a device transceiver, such as a radiofrequency (RF) transceiver. Components and functions of an exemplary mobile communications device 104 are described in more detail below, with respect to FIG. 4. Upon receiving the map data the map application can temporarily store the data in a memory or cache of the device, such as RAM. The map application of the mobile communications device 104 is further configured to render visual maps, text, or audible information, based on the received data, to the user of the device, via a user interface (UI), such as a display and speakers.

Requests for map data from the mobile communications device 104 are passed to the map server 300 by way of the wireless network 102 and the data network 106. For embodiments in which the data network 102 includes the Internet, for example, the request may be passed using standard packet-forwarding protocols to the map server 300. It will be appreciated that the response from the map server 300 to the mobile communications device 104 is in some embodiments also passed using standard packet-forwarding protocols.

While the map server 300 is described in the singular sense, it may include multiple servers with shared and/or respective resources, such as databases. For example, in some embodiments, the map server 300 includes one or more public map servers and/or one or more private or corporate enterprise map servers, or corporate mobile data system (MDS) servers. In some embodiments of the present disclosure including multiple map servers, the system 100 includes one or more relays (not illustrated) for routing requests for geographical information to the appropriate server(s).

For some embodiments having a private map server or corporate map server, the data network and/or the private server includes a secure channel and/or firewall to control access to the private or corporate map server.

When map data from multiple sources is being sent to the mobile communications device 104, the map data from one source (e.g., a private map server) may be added to the generic map data prepared by another source (e.g., a public map server) before the combined or merged data is provided to the mobile communications device 104.

In some embodiments, information added to generic map data before it is provided to the mobile communications device 104 includes audible, text, or graphics associated with the query. Examples of graphics are highlighting of a route, pushpin or vehicle for current position or street address, star or target for destination, private or corporate information (e.g., locations of private facilities or routes, and information such as passcodes or instructions), etc. Such added information is in some embodiments post-processed (i.e., processed after generic map structure or data therefor has been developed), and merged by the map server 300 with the generic map content.

The map server 300 is in some embodiments associated with one or more location-based services (LBS) servers (not illustrated), which provide LBS services for use in responding to requests for geographical information such as map or navigating data.

In the illustrated embodiment, the map server 300 is a combination of hardware and software. The illustrated map server 300 includes one or more memory modules 302 that are operatively linked and in communication with one or more processors 304 via one or more data/memory busses 306. The illustrated evaluation server 300 also includes a network interface 308 for facilitating communication with mobile communications devices 306. In some embodiments, the map server 300 includes a route information server (RIS) for providing routing information. In some embodiments, the database 302 includes a Geographical Information Systems (GIS) map database, such as available from Navteq, of Chicago, Ill., or TeleAtlas, of Lebanon, N.H.

While the map server 300 is illustrated as a single component in FIG. 1, in some embodiments the evaluation server includes two or more servers. The various servers are in some embodiments co-located, in some embodiments remote to one another, and in some embodiments a combination of co-located servers and one or more remote servers.

As used herein, memory collectively includes all memory types associated with the map server 300, such as, for example, any one or more of the memory types described above regarding the evaluation server 200. While the memory 302 of the map server 300 is illustrated as residing proximate the processor 304, it should be understood that the memory 302 can be a remotely accessed storage system, such as, a local server, an Internet server, a remote hard disk drive, a removable storage medium, a network storage device, combinations thereof, and the like. Any of the data, applications, and/or software described below in connection with the map server 300 can be stored within the memory 302, as illustrated, and/or accessed via network connections to other data processing systems. Accordingly, in some embodiments of the present disclosure, the map server 300 is configured as a server to one or more client data processing systems, such as mobile communications devices 104, as dictated by a client/server model, for example.

The map server processor 304 is configured to receive information relating to performance characteristics of the wireless communications network 102 by way of the network interface 308. The processor 304 is further configured to store the performance information in the memory 302. As provided above, in some embodiments the memory 302 includes one or more databases that the processor 304 of the map server 300 can access to store and/or retrieve data. It will be appreciated that in some embodiments the map server 300 and/or the storage functions are distributed amongst a plurality of servers and/or storage locations.

In some embodiments, the map server 300 can provide, in response to request, various levels of data. For example, the map server 300 could provide data for only the specific travel path, such as roadways of the strict route. In this way, only a relatively small amount of information is transmitted over the networks 102/106, and the mobile communications device 104 needs to process, cache, and display less information. While the present disclosure describes route information with primary reference to roadways, such as streets and highways, the disclosure is not limited to map information or roadways, and may include information in the form of other visual data, text, or sounds, and may portray non-road information such as sidewalks, walking or riding (e.g., bike) paths, airways, waterways, etc.

As the mobile communications device 104 moves along the delivered route, the mobile communications device 104 (e.g., a map application of the device) checks the memory for needed information for an upcoming part of the route. If the needed information is not cached on board the device 104, then the device (e.g., the device processor executing the onboard map application) submits a request for the needed information to the network 102. The mobile communications device 104, however, may be unable to connect to the network 102 or maintain a connection to the network sufficient to transmit the request or receive the additional route data In this case, the user will not be able to receive the needed information until connection is achieved. In the interim, the user may become lost, or may have already been lost at the time the request for additional data was made. For example, the user may take a wrong turn when the network is not available for obtaining re-routing information.

One approach for avoiding the mobile communications device 104 needing to request route data during the route, assuming the user makes no turns off of the route, is for the map server 300 (e.g., RIS) to provide map data for the entire route to the mobile communications device 104 in the initial response to the request. In this way, the entire route is provided up front, while the device is in coverage, and additional route data does not need to be provided later during the trip.

Figure 2:
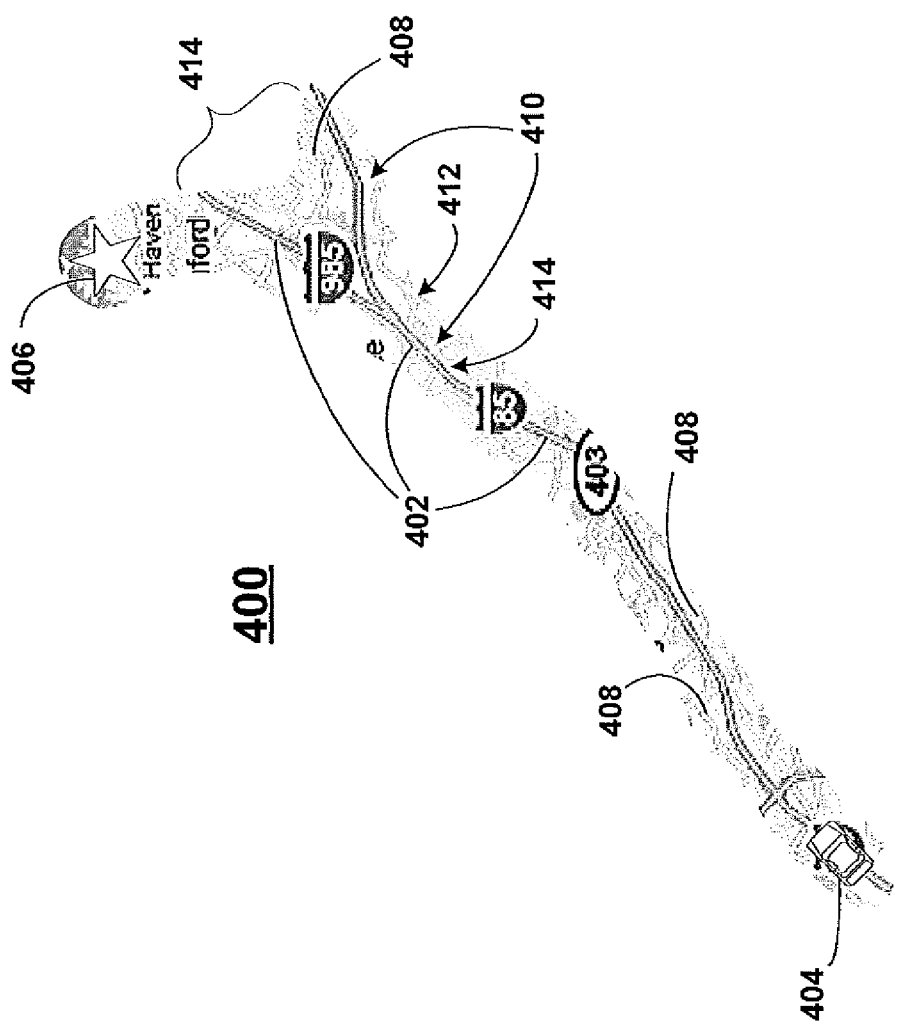
FIG. 2 illustrates an exemplary basic route map, according to an embodiment of the present disclosure.

To compensate for situations in which the user deviates slightly from the route by wrong turn or on purpose (e.g., gas or food stop), the map server 300 in some embodiments provides extra map data to the mobile communications device 104 in addition to the roadways of the route. The extra map data may be referred to as a halo or, because second level map data may be provided in addition to the halo, as provided below, may be referred to as first level map data. The method for providing such first level extra map data may be referred to as a hybrid method of providing network data, being a hybrid of the aforementioned onboard and offboard arrangements. FIG. 2 shows a route map 400 including a strict route 402. The strict route 402 consists of the specific roadway(s) between an origin 404 and a destination 406.

In some embodiments, first level extra map data 408 is provided on one or both sides of the strict route 402. The first level extra map data 408 covers a certain pre-set distance from the roadway. For instance, the first level extra map data 408 may include map data covering 0.1 mile on both sides of the roadway of the route, or other pre-determined or dynamically-determined amount. In some embodiments, the map server 300, in determining the amount of first level extra map data 408 to provide with route data considers a likely amount of map data required to re-route users, having made common or slight deviations, back to the route. The map server 300, in some embodiments, considers travel factors such as construction, one-way streets, and traffic flow or patterns in the area.

The map server 300, in some embodiments, considers a likely amount of map data needed to re-route the user in the event of relatively slight deviations, such as common user deviations (e.g., gas stops, food stops, and common wrong turns of users). For example, with further reference to FIG. 2, the map server 300 may determine, or receive data indicating that users traveling north from the city near the origin 404 to the destination 406 often end up staying on a first highway 410 too long by missing a needed highway change at an interchange 412. For this case, the map server 300 may be configured to provide first level extra map data 408 around the first highway 410 beyond the interchange 412 to accommodate re-routing or new route generation.

As another example, again with reference to FIG. 2, for scenarios in which the map server 300 determines, or receives data indicating that roadways in an area 414 are for some reason confusing to drivers, or for some other reason likely to lead to wrong turns (e.g., one-way streets leading across town unless the user knows to take a certain street), the map server 300 may be configured to provide first level extra map data 408 beyond the interchange 412 to accommodate re-routing.

The map server 300 is in various embodiments configured to, in determining the amount of map data to provide to the mobile communications device 104, consider advanced variables such as user characteristics, user preferences, and/or characteristics of the wireless communications network 102. Example variables include network load, coverage, and habits of a particular user or a group of all users. In some embodiments, the map server 300 obtains network 102 characteristics from the evaluation server 200 described above via the data network 106. It is contemplated that the map server 300 may procure characteristics about the network 102 from other sources and in other ways without departing from the scope of the present disclosure.

In some embodiments, the map server 300 is configured to determine whether variables should and/or can be considered in providing map data to the mobile communications device 104. For example, the map server 300, the evaluation server 200, the wireless network 102, or one or more entities controlling them may maintain a program for providing such service. The mobile communications device 104 or user of the device may or may not be a participant of the program. In some embodiments, the map server 300 considers relevant resources, such as resources of the map server 300 (e.g., server load), the evaluation server 200 (e.g., server load), the data network 106, and/or the wireless communications network 102 (e.g., available bandwidth, load, etc.) in determining whether to provide the tailoring or custom routing service. Other contemplated variables include dates, times of day (e.g., rush hour), the location of the device (e.g., urban versus rural, or certain areas), density or network load along the route, coverage along a route, and user preferences or habits.

Figure 3:
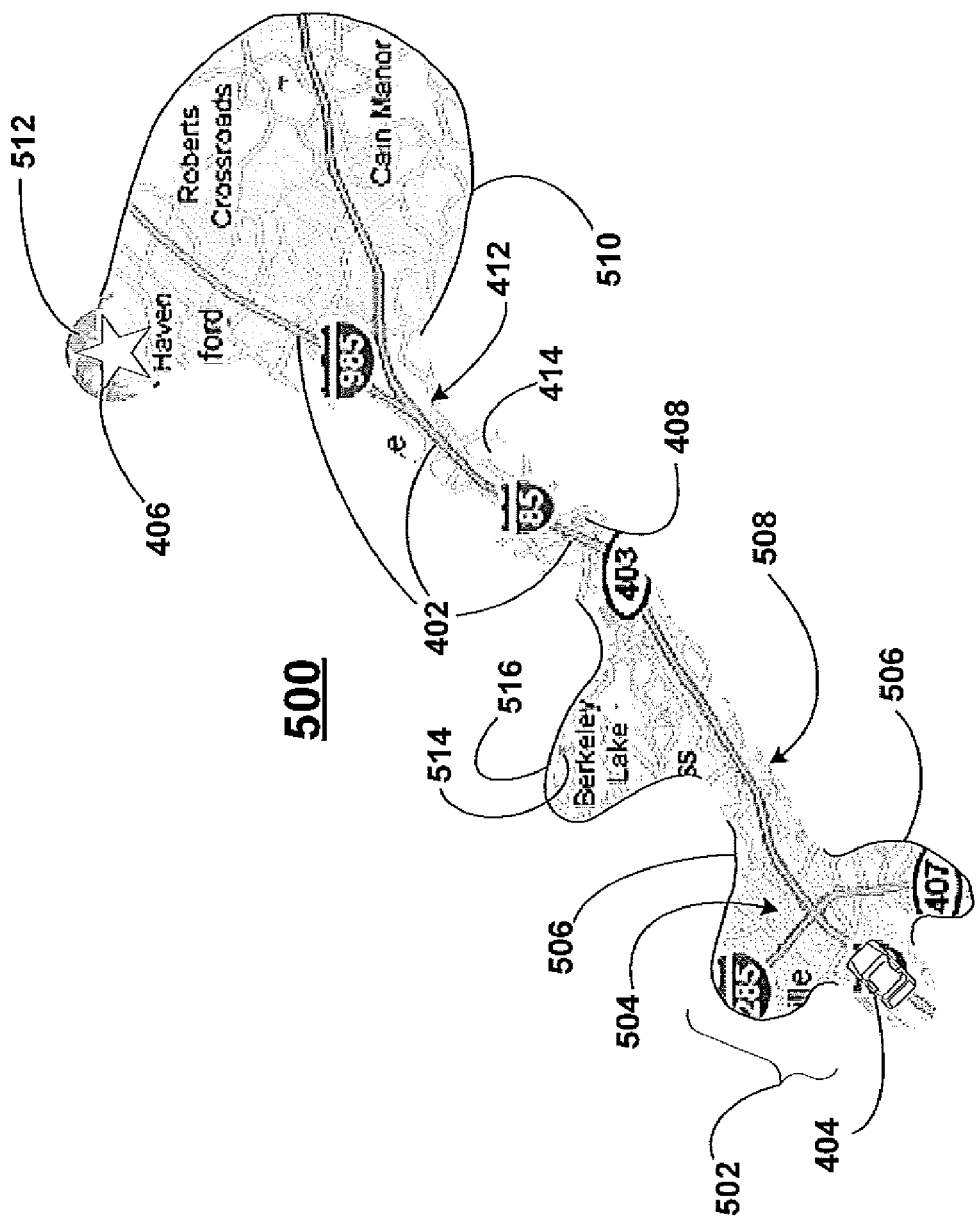
FIG. 3 illustrates an exemplary tailored or custom route map, according to an embodiment of the present disclosure.

In some embodiments, the map server 300 considers characteristics of the network 102 along the strict route 402 for use in tailoring or customizing the route to be delivered to the mobile communications device 104. As an example, with reference to the route map 500 of FIG. 3, if the map server 300 determines that the signal strength is weak in an area 502 around a particular highway junction 504 due, for example, to the location of buildings within local call sites (not shown), the map server 300 may provide second level extra map data 506 in the area.

The second level extra map data 506 is in some embodiments provided to be extra cushion, such as in addition to already included extra map data (e.g., halo) that would otherwise be provided in the area. In some embodiments, the second level map data 506 is determined and directly to the strict route 402, without a preceding step of calculating first level map data 408. In these embodiments, the second level map data 506 could include what would otherwise be considered first level map data 408 (e.g., a basic cushion or halo of map data). The second level extra map data 506 in the area can be used to re-route the user if she or he goes off-route in the area.

The map server 300 is configured to identify second level map data to provide, including an amount of map data, depending on one or more variables. For example, the map server 300 may consider variables described above with respect to the provision of the first level extra map data. The variables include, for example, an expected amount of data needed to re-route users going on likely detours. The map server 300 can add the additional buffer of map data considering that coverage is not available or will not likely be available in the area around the junction 504.

If the mobile communications device 104 moves beyond first level extra map data 408 in an area of strong coverage, the device 104 could simply request additional map data for re-routing back to the route, or requesting a new route. Because the mobile communications device 104 will likely have connectivity problems in the area 502 around the highway junction 504 in FIG. 3, the systems and methods of the present disclosure render the mobile communications device 104 better able to re-route a user travelling off-route in the area.

In some embodiments, the map server 300, as part of tailoring the route to be delivered to the mobile communications device 104, evaluates the network (e.g., coverage and load) along a route and assigns a score or rank to various portions of the route based on a likelihood that the mobile communications device 200 will be able to maintain wireless communications in the relative portions, or a likelihood that the device 200 will not be able to do so. The likelihood factor, or other point or quantifiable rank system is in some embodiments used by the map server 300 to determine the amount (including location) of map data to provide to the mobile communications device 104. The map server 300 is in some embodiments configured to determine an amount of map data to provide and/or timing of downloading one or more portions of the route.

In one embodiment, the map server 300 can assign a connection-quality score, such as between 1 and 10. If coverage is excellent and load is light in a particular area 508, the call-quality score can be set to 1. Accordingly, less map data needs to be provided to the device 104 for this area 508, because if the user takes a detour, the device should easily be able to obtain re-routing or new-route information from the map server on request. In this way, the system 100 minimizes load on the network 102 and the mobile communications device 104 for unnecessary, or likely unnecessary, map data, which results, for example, in a better use of network bandwidth.

As described above, whether one or multiple characteristics of the network 102 are considered, the map server 300 in some embodiments characterizes the network 102 as weak or strong in an area, such a due to the characteristic(s) making the network below or above threshold values for being weak or strong, respectively. In some particular embodiments, the strong or weak characterization relates to a scoring system, such as those described above. For example, scores above (or below) a certain score for an area of the network 102 could equate to the network being considered weak or strong in the area.

If coverage is very weak and load is very high in an area 502, the map server 300 can assign a connection-quality factor of 10 to that route area 502. Accordingly, more map data would more likely be needed in this area 502 because the mobile communications device 104 will likely have trouble obtaining re-routing or new-route information while in the area. The map server 300 determines an amount of map data to provide, and/or timing of downloading one or more portions of the route for areas corresponding to intermediate connection-quality scores on this exemplary scale (i.e., 2 through 9). The increments and format of the scores described here are provided merely for example, and other increments (e.g., increments of 0.1 point, from 0 to 100, or A, B, . . . Z, AA, . . . ZZ, etc.) may be used.

In some embodiments, the map server 300 tailors the route by providing second level extra map data 510 in response to determining that the network is presently loaded (e.g., rush-hour traffic adjacent the interchange 412) above a threshold load and/or likely to be loaded above the threshold load based on historic information regarding network load in the area at the time. The threshold load could be, for example, a load determined to make it likely to a certain degree that a mobile communications device 104 would not be able to establish or maintain connection to the wireless communications network 102. It is contemplated that, in some embodiments, the threshold load is variable, such as in response to the status or condition of other network features or parameters.

In some embodiments, the map server 300 considers preferences (such as those stored on a subscriber identify module (SIM) card), habits, or past actions of the user requesting the map data. For example, with reference again to FIG. 3, if the map server 300 obtains (e.g., retrieves, receives, and/or generates, and the like) information establishing that the user, when headed northbound to a lake 512 adjacent the destination 406, often mistakes an intermediate lake 514 as the destination and turns off-route there, the server 300 can provide second level extra map data 516 in the area of the intermediate lake 514 to re-route the user.

The map server 300 is in some embodiments is configured to consider a combination of factors in determining what extra map data to provide to the mobile communications device 104. The server 300 may determine that a combination of factors justifies providing second level extra map data when consideration of just one of the factors may not have justified second level extra map data. For example, with further reference to FIG. 3, the server 300 may determine that two or more of the following conditions exist: (1) network coverage is relatively low in the area around the highway interchange 410; (2) network load in the area is relatively low or is expected to be relatively low based on historic data; (3) mobile communications device 104 operators often make a wrong turn in the area; and (4) the specific user requesting the route often makes a wrong turn in the area. Whether one or multiple characteristics of the network 102 are considered, the map server 300 in some embodiments characterizes the network 102 as weak or strong in an area, such a due to the characteristic(s) making the network below or above threshold values for being weak or strong, respectively.

Though each condition may not on its own have been sufficient to justify for providing second level extra map data to the mobile communications device 104, such as map data beyond a baseline allotment of extra map data, the map server 300 is in some embodiments configured to consider that the second level extra map data 506, 510, 516 is justified based on the combination of conditions. Further, the map server 300 is in some embodiments configured to increase or decrease an amount of map data provided in areas based on particular values associated with a characteristic (e.g., how large of a load, or how far over or below a threshold load), and not just on whether a trigger level is met. In some embodiments, the server 300 is configured to consider multiple characteristics, whereby, for example, (a) higher values for one characteristic could outweigh to some extent lower values for another, or (b) only relatively low values regarding a few characteristics combine to justify providing second level extra map data, where the second level extra map data would not be justified if only less than all of these few characteristics were relatively low as such.

In some embodiments, the map server 300 determines the amount of extra map data to provide with respect to a baseline amount of extra map data. For example, if the map server 300 has identified a baseline amount of extra map data for a route, such as depending on a distance likely to be needed to re-route the user in the event of a deviation (e.g., gas or food stop), the map server 300 can determine a specific amount of extra map data to provide to the device 104 being less than the baseline route in some places and/or as being greater than the baseline route in other places.

In these ways, the map server 300 is configured to efficiently provide map data to a requesting mobile communications device 104 by efficiently utilizing network and device resources.

If the map server 300 determines that a user is likely to some extent (e.g., low likelihood, likely, very likely, or surely), be in coverage at a certain time, the server 300 can provide a lower amount of extra data, in relative terms, such as little or no halo, or little to no second level extra map data beyond a baseline halo. In this way, less data is transmitted over the network 102 and cached and processed at the device 104. If the mobile communications device 104 moves off route and beyond the extent of cached map data, the mobile communications device 104 should have no trouble connecting in order to obtain re-routing or new-route information. Also, though the map server 300 determines to send additional map data (e.g., second level extra map data 506, 510, and 516) in some target areas, lower amounts of data provided in other area(s) (e.g., high network coverage/low network load areas) can be seen as compensating for the increased data needed at the target area(s).

The map server 300 need not provide the route information to the mobile communications device 104 all at one time, such as all in immediate response to the initial request. In some embodiments, the map server 300 is configured to, for example, provide map data to the mobile communications device 104 at a timing (e.g., according to a schedule), or a timing and amount, based on one or more aforementioned advanced variables, such as network load and coverage. As an example, if the map server 300, in responding to a request for a route, determines that the mobile communications device 104 is in a relatively low coverage and/or high load portion of the network 102, such as the area 502 adjacent the highway junction 504, the map server 300 could initially provide the user with only strict route data (i.e., just the roadway, with no extra map data). In this way, less data is provided over the network 102 in an already troublesome area than would otherwise be provided absent this determination by the map server 300.

In this embodiment, the map server 300 may be further configured to determine that the mobile communications device 104 is expected to pass through a relatively high coverage and low load area 508 along the route. The server 300 is configured to plan to, or schedule downloading of extra and/or second level extra map data to the mobile communications device 104 when the device enters the relatively high-coverage/low-load area 508. In this way the system 100 accomplishes further efficiencies in that data not needed until later in the route is not sent across the network before it is needed, and is strategically sent at a better time, and when the device is in a more optimal location for the download from the perspective of the network.

Exemplary Mobile Communications Device

Figure 4:
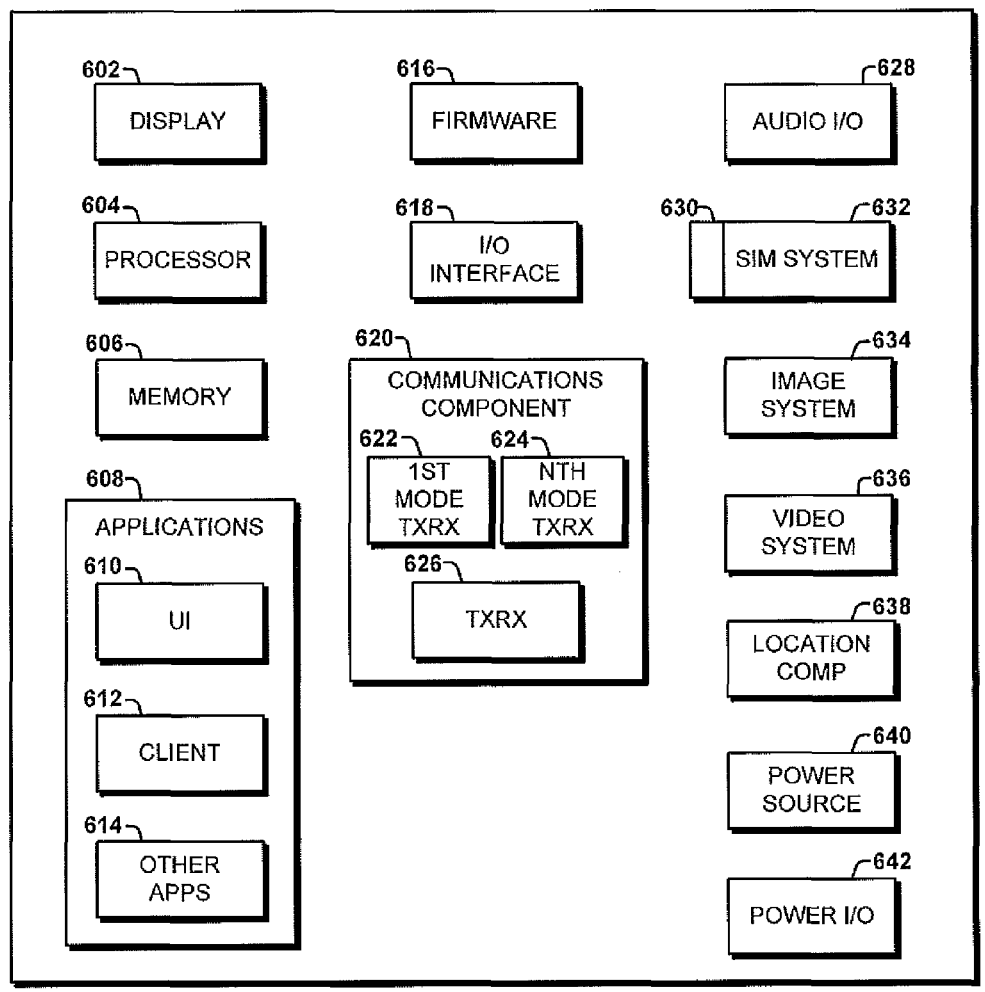
FIG. 4 illustrates an exemplary mobile communications device and components thereof, according to an embodiment of the present disclosure.

FIG. 4 illustrates a schematic block diagram of an exemplary mobile communications device 104 for use in accordance with embodiments of the present disclosure. Although connections are not shown between the components illustrated in FIG. 4, the components can interact with each other to carry out device functions. In some embodiments, for example, the components are arranged so as to communicate via one or more busses (not shown). It should be understood that FIG. 4 and the following description are intended to provide a general understanding of a suitable environment in which the various aspects of some embodiments of the present disclosure can be implemented.

In some embodiments, the mobile communications device 104 is a multimode headset and has a variety of computer-readable media, including, for example, volatile media, non-volatile media, removable media, and non-removable media. The term "computer-readable media" and variants thereof, as used in the specification and claims, refers to storage media and communication media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other medium that can be used to store the desired information and that can be accessed by the mobile communications device 104.

As illustrated in FIG. 4, the mobile communications device 104 includes a display 602 for displaying multimedia such as, for example, routes in the forms of maps, text, etc., and other geo-information, application graphical user interfaces (GUIs), text, images, video, telephony functions such as Caller ID data, setup functions, menus, music, metadata, messages, wallpaper, graphics, Internet content, device status, preferences settings, map and location data, and the like. The illustrated mobile communications device 104 also includes a processor 604 for controlling, processing data, and/or executing computer-executable instructions of one or more applications, and a memory 606 for storing data and/or one or more applications 608.

In some embodiments, the application(s) 608 include a user interface (UI) application 610. The UI application 610 interfaces with a client 612 (e.g., an operating system (OS)) to facilitate user interaction with device functionality and data. In some embodiments, the client 612 is one of Symbian OS, Microsoft® Windows® Mobile OS (available from Microsoft Corporation of Redmond, Wash.), Palm® webOS™ (available from Palm Corporation of Sunnyvale, Calif.), Palm® OS (available from Palm Corporation), RIM® BlackBerry® OS (available from Research In Motion Limited of Waterloo, Ontario, Canada), Apple® iPhone® OS (available from Apple Corporation of Cupertino, Calif.), or Google™ Android™ OS (available from Google of Mountain View, Calif.). These operating systems are merely exemplary of the operating systems that can be used in accordance with the embodiments disclosed herein. Other operating systems are contemplated.

The UI application 610 aids the user in entering message content, viewing received messages, answering/initiating calls, entering/deleting data, entering and setting user IDs and passwords, configuring settings, manipulating address book content and/or settings, interacting with other applications 614, and the like. In some embodiments, the other applications 614 include, for example, add-ons, plug-ins, email applications, music applications, video applications, camera applications, location service applications (LSAs), power conservation applications, game applications, productivity applications, entertainment applications, enterprise applications, customer information management applications, accounting applications, authentication applications, map applications, proprietary business applications, manufacturing applications, production applications, payroll applications, combinations thereof, and the like. The applications 608 are stored in the memory 606 and/or in a firmware 616, and can be executed by the processor 604. The firmware 616 can also store code for execution during device 104 power up, for example.

The illustrated mobile communications device 104 also includes an input/output (I/O) interface 618 for input/output of data, such as, for example, user IDs, passwords, and application initiation (start-up) and operation requests, such as requests for a route from an origin (e.g., present location) to a destination. In some embodiments, the I/O interface 618 is a hardware connection, such as, for example, a USB, mini-USB, audio jack, PS2, IEEE 1394, serial, parallel, Ethernet (RJ48) port, RJ11 port, or the like. In some embodiments, the I/O interface 618 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 618 can be used for communications between the mobile communications device 104 and a network such as the described network 102, or local device, instead of, or in addition to, a communications component 620.

The communications component 620 interfaces with the processor 604 to facilitate wired/wireless communications with external systems. Example external systems include, but are not limited to, intranets, network databases, network storage systems, cellular networks, location systems, Voice over Internet Protocol (VoIP) networks, local area networks (LANs), wide area networks (WANs), metropolitan area networks (MANs), personal area networks (PANs), and other networks. In some embodiments, the external systems are implemented using WIFI, WIMAX, combinations and/or improvements thereof, and the like. In some embodiments, the communications component 620 includes a multimode communications subsystem for providing cellular communications via different cellular technologies. In some embodiments, for example, a first cellular transceiver 622 operates in one mode, such as, Global System for Mobile communications (GSM), and an Nth transceiver 624 operates in a different mode, such as Universal Mobile Telecommunications System (UMTS). While only two transceivers 622, 624 are illustrated, it should be appreciated that a plurality of transceivers can be included.

The illustrated communications component 620 also includes a transceiver 626 for use by other communications technologies such as, for example, WIFI, WIMAX, BLUETOOTH, infrared, infrared data association (IRDA), near field communications (NEC), RF, and the like. In some embodiments, the communications component 620 also facilitates reception from terrestrial radio networks, digital satellite radio networks, Internet-based radio services networks, combinations thereof, and the like. The communications component 120 can process data from a network such as, for example, the Internet, an intranet (e.g., business intranet), a home broadband network, a WIFI hotspot, and the like, via an ISP, DSL provider, or broadband provider. In some embodiments, the communications component 620 facilitates the transmission of authentication information from the mobile communications device 104 to a network for processing in accordance with the methods described herein.

Audio capabilities for the mobile communications device 104 can be provided by an audio I/O component 628 that includes a speaker for the output of audio signals and a microphone to collect audio signals.

The illustrated mobile communications device 104 also includes a slot interface 630 for accommodating a subscriber identity system 632 such as, for example, a subscriber identity module (SIM) card or universal SIM (USIM) card. Alternatively, the subscriber identity system 632 can be manufactured into the device 104, thereby obviating the need for a slot interface 630. In some embodiments, the subscriber identity system 632 stores user preferences (e.g., routing or map presentation preferences), characteristics of the user (e.g., history of performance following routes), and user IDs, passwords, and passcodes for use with local and remote applications and gateways, such as the firewalls or secure channels described herein in association with private or corporate map servers. In some embodiments, the subscriber identity system 632 is programmed by a manufacturer, a retailer, a user, a computer, a network operator, or the like.

The illustrated mobile communications device 104 also includes an image capture and processing system 634 (image system). Photos and/or videos can be obtained via an associated image capture subsystem of the image system 634, for example, a camera. The illustrated mobile communications device 104 also includes a video system 636 for capturing, processing, recording, modifying, and/or transmitting video content.

The illustrated mobile communications device also includes a location component 638 for sending and/or receiving signals such as, for example, GPS data, assisted GPS (A-GPS) data, WIFI/WIMAX and/or cellular network triangulation data, combinations thereof, and the like, for determining a location of the mobile communications device 104. In some embodiments, the location component 638 interfaces with cellular network nodes, telephone lines, satellites 108 (shown in FIG. 1), location transmitters and/or beacons, wireless network transmitters and receivers, for example, WIFI hotspots, radio transmitters, combinations thereof, and the like. In some embodiments, the location component 638 retrieves location information at the request from a location services application (LSA).

Using the location component 638, the mobile communications device 104 obtains (e.g., retrieves, receives, and/or generates, etc.) data to identify its location, or transmits data used by other devices to determine the mobile communications device 104 location. In some embodiments, the location of the mobile communications device 104 is used by the geo-information application (e.g., map application) or other application to create an authentication message sent from the mobile communications device 104 to a network server to authenticate the device, a request from the device, or one or more applications, such as to a firewall or secure channel associated with a private or corporate map server.

The illustrated mobile communications device 104 also includes a power source 640, such as batteries and/or other power subsystem (AC or DC). The power source 640 can interface with an external power system or charging equipment via a power I/O component 642.

Although connections are not shown between the components illustrated in FIG. 4, the components can interact with each other to carry out system functions. It should be understood that FIG. 4 and the descriptions herein are intended to provide a brief, general description of a suitable environment in which the various aspects of some embodiments of the present disclosure can be implemented.

Exemplary Method of Operation

Figure 5:
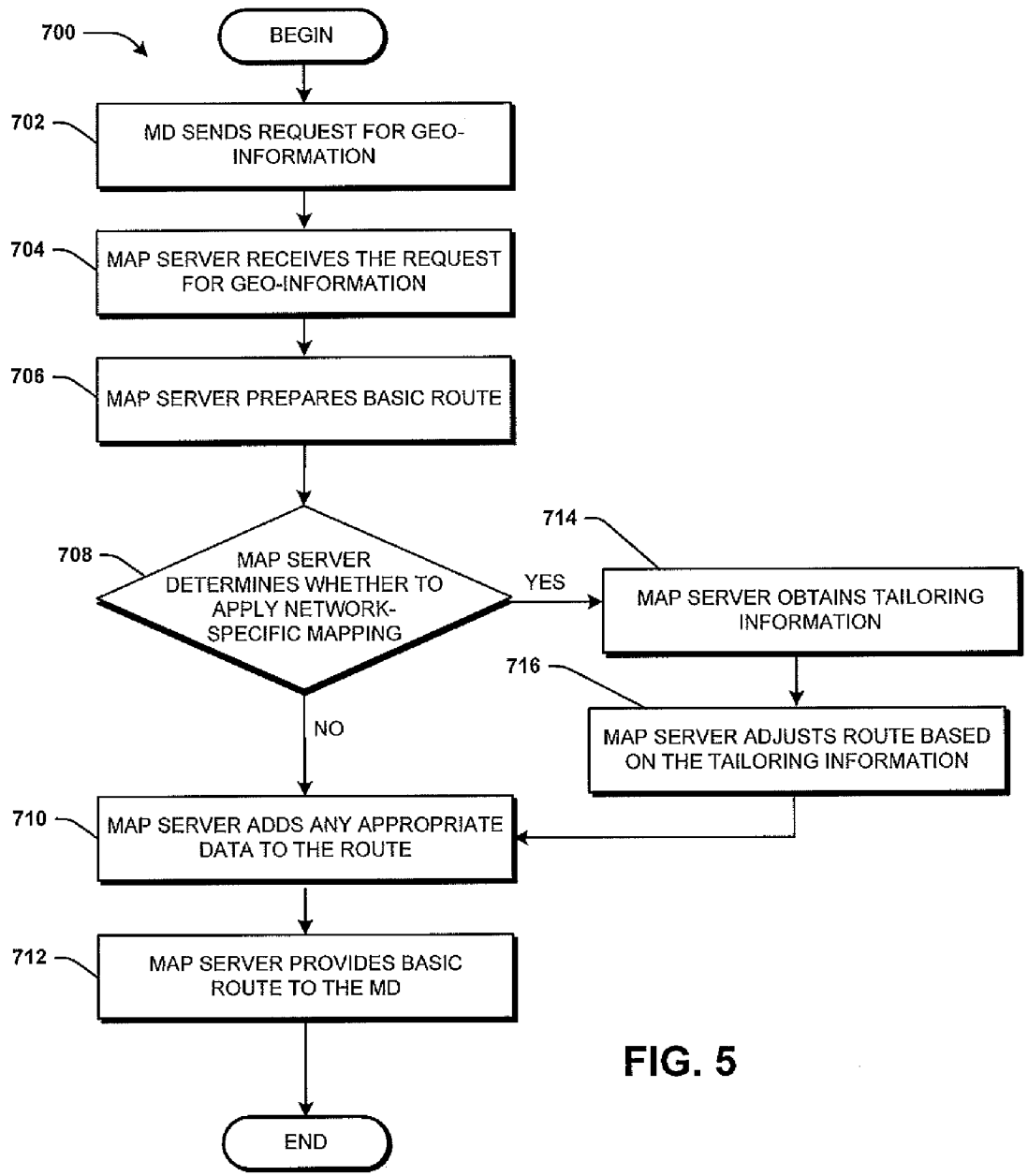
FIG. 5 illustrates an exemplary method for providing geographical information to mobile communications devices, according to an embodiment of the present disclosure.

Referring now to FIG. 5, an exemplary method 700 for providing geo-information, such as route data, to the mobile communications device 104. As described above, while the present disclosure primarily describes requests from the mobile communications device 104 for map data, and preparation of the requested map data for delivery to mobile communications devices, the description is merely exemplary and also applies to requests, preparation, and delivery of other types of geo-information, including other location-based services, such as text or voice directions, whether a map, per se, is required to satisfy the mobile communications device user's needs.

The steps of the method 700 are not necessarily presented in particular order and performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 700 can be ended at any time. In certain embodiments, some or all steps of this process, and/or substantially equivalent steps are performed by execution of computer-readable instructions stored or included on a computer-readable medium, such as the memory 606 of the mobile communications device 104, the memory module 302 of the map server 300, and/or the memory module 202 of the evaluation sever 200, for example.

In some embodiments, the method 700 begins at step 702 with the mobile communications device 104 sending a request for geographical information, such as route information to the map server 300. At step 704, the map server 300 receives the request from the mobile communications device 104.

At step 706, the map server 300 prepares a basic or generic route specific to the device 104. As described above, the map server 300, in some embodiments, provides map or route data to the mobile communications device 104 in response to a request from the device 104 (known as a "pull" arrangement), and in some embodiments provides map or route data without having been specifically prompted by an immediately preceding request from the mobile communications device (a "push" arrangement). As such, in some embodiments of the present disclosure, the method 700 begins at step 706, with the map server preparing a basic route. The map server 300 may prepare and push map or route data to the mobile communications device 104 in response to various stimuli, such as automatically at regular time intervals or in response to occurrence of a circumstance, such as an emergency situation.

The basic route may include only route paths (e.g., only the roadways of the route), or may include extra map data (i.e., a halo) prepared without specific evaluation of advanced variables (e.g., present or expected network characteristics along the route, user habits or preferences, and actions of other users), as described in the Geo-Information Overview section, above.

In some embodiments, the map server 300 determines whether advanced variables, such as network and/or characteristics of the user and/or other users, should and/or can be considered in providing map data to the mobile communications device 104, at step 708. For example, the map server 300 can determine whether the mobile communications device 104 or the user of the device is registered with a network-specific or other mapping program, such as a program established by one or more entities operating the map server 300 and/or the wireless communications network. In making this decision, the map server 300 in some embodiments considers relevant resources, such as resources of the map server 300, the evaluation server 200, the data network 106, and/or the wireless communications network 102. Other contemplated variables include dates, times of day (e.g., rush hour), the location of the device (e.g., city versus country, or certain areas), density or load along the route, coverage along a route, and user preferences or habits.

If the map server 300 determines at step 708 that the network and/or user-specific mapping should not or cannot be provided, the method proceeds to step 710 whereat the map server 300 may add usual supplemental data to the basic route, such as audible, text or graphical data, such as custom graphics, highlighted route, pushpin or vehicle for current position or street address, star or target for destination, private or corporate information (e.g., locations of private facilities or routes, or information such as passcodes or instructions), etc. As mentioned above, steps of the method 700 could be performed in various order. Here, the supplemental information provided at step 710 could be performed as part of preparing the basic route at step 706, for example.

Upon completion of the basic route, including any supplemental features added at step 710, the map server 300 provides the route to the mobile communications device at step 712, and the method 700 can end there.

If the map server 300 determines at step 708 that the network and/or user-specific mapping should or can be provided, the method proceeds to step 714 whereat the map server 300 obtains information with which to tailor or customize the basic route. Obtaining information, in various embodiments includes retrieving, receiving, generating, and/or the like. As described above in more detail, the map server 300 may procure such information from the evaluation sever 200, the wireless network 102, the mobile communications device 104, its own memory or database 302, other sources, or a combination of these sources, without departing from the scope of the present disclosure.

As also provided above, the information obtained by the map server 300 may include known or determined present, real-time, or expected or predicted characteristics or conditions of the wireless communications network 102 along the route, user preferences or habits, present or historical actions of others, weather, traffic, and the like. In various embodiments, the map server 300 uses the obtained information to tailor the route, as described above. The map server 300 in some embodiments uses the obtained information to control a timing with which the route or parts thereof are provided to the mobile communications device 104, as also described above.

At step 716 the map server 300 adjusts the basic route prepared at step 706 based on the tailoring information obtained at step 714, as provided herein. For example, the map server 300 may provide second level extra map data in one or more areas adjacent the strict route (i.e., adjacent the path itself), such as in response to determining that load is high and/or coverage is weak in the one or more areas. The map server 300 could also provide less extra map data (i.e., less halo than a basic provision) in one or more areas, such as in response to determining that load is low and coverage is strong in the one or more areas.

Upon completion of the tailored or custom route at step 716, the method proceeds to step 710 whereat the map server 300 adds supplemental data to the tailored or custom route, as appropriate. As described above, this supplemental information could include, for example, audible, text or graphical information, such as custom graphics, highlighted route, pushpin or vehicle for current position or street address, star or target for destination, private or corporate information (e.g., locations of private facilities or routes, or information such as passcodes or instructions), etc. Because steps of the method 700 are performed in various order in various embodiments of the present disclosure, the supplemental information provided to the tailored or custom route at step 710 could be performed as part of preparing the basic route at step 706 and/or as part of preparing the tailored or custom route at step 716, for example.

Upon completion of the tailored or custom route, including any supplemental features added at step 710, the map server 300 provides the route to the mobile communications device at step 714. As described above, the map server 300 in some embodiments uses the obtained information to control a timing with which the route or parts thereof are provided to the mobile communications device 104. As such, the map server 300 could at step 712 cause to be provided to the mobile communications device 104 all of the route, or parts of the route at various times, such as according to a prepared schedule or based upon mobile communications device 104 position in the network.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system for providing a tailored route to a mobile communications device over a wireless communications network, the system comprising:
    a map server including a processor and a memory storing instructions executable by the processor to make the map server operable to:
        prepare a basic route from a route origin to a route destination;
        obtain information regarding characteristics of the wireless communications network along the basic route;
        prepare the tailored route using the basic route and the network characteristics information; and
        provide the tailored route to the mobile communications device over the wireless communications network.

2. The system of claim 1, wherein the instructions are executable by the processor to make the map server further operable to:
    receive a request from the mobile communications device by way of the wireless communications network; and
    prepare the tailored route in response to the map server receiving the request from the mobile communications device.

3. The system of claim 1, further including:
    an evaluation server configured to analyze the wireless communications network and prepare data regarding conditions of the network;
    wherein the instructions, in being executable by the processor to make the map server operable to obtain information regarding characteristics of the wireless communications network along the basic route, are executable by the processor to make the map server operable to obtain at least some of the information from the data prepared by the evaluation server.

4. The system of claim 1, wherein:
    the instructions, in being executable by the processor to make the map server operable to provide the tailored route to the mobile communications device over the wireless communications network, are executable by the processor to make the map server operable to provide the tailored route to the mobile communications device in a format enabling the mobile communications device to render the tailored route to a user of the mobile communications device as textual directions and/or as audible directions.

5. The system of claim 1, wherein:
    the instructions, in being executable by the processor to make the map server operable to provide the tailored route to the mobile communications device, are executable by the processor to make the map server operable to:
        identify multiple parts of the tailored route to be provided separately;
        identify a condition precedent to sending a subsequent part of the multiple parts of the tailored route to the mobile communications device;
        provide an initial part of the multiple parts of the tailored route to the mobile communications device;
        determine that the condition precedent has been met; and
        provide the subsequent part of the tailored route to the mobile communications device in response to determining that the condition precedent has been met.

6. The system of claim 5, wherein:
    the instructions, in being executable by the processor to make the map server operable to identify the condition precedent to sending the subsequent part of the tailored route to the mobile communications device, are executable by the processor to make the map server operable to:
        identify the condition, wherein the condition is the mobile communications device moving into a subsequent portion of the wireless communications network having or expected to have better network coverage and/or better load characteristics than an initial portion of the wireless communications network in which the mobile communications device is positioned when the initial part of the tailored route is provided to the mobile communications device.

7. The system of claim 1, wherein:
    the instructions, in being executable by the processor to make the map server operable to prepare the basic route from the origin to the destination, are executable by the processor to make the map server operable to prepare a strict route including only a path of the basic route.

8. The system of claim 7, wherein:
    the instructions, in being executable by the processor to make the map server operable to prepare the basic route from the origin to the destination, are executable by the processor to make the map server operable to prepare the strict route and first level extra map data adjacent the strict route to accommodate potential re-routing in the event of a detour from the strict route by the mobile communications device.

9. The system of claim 8, wherein:
    the instructions, in being executable by the processor to make the map server operable to prepare the tailored route, are executable by the processor to make the map server operable to:
        determine an amount of second level extra map data to add to the first level extra map data of the basic route adjacent a portion of the route determined to be weak; and/or
        determine an amount by which to reduce the first level extra map data of the basic route adjacent a portion of the route determined to be strong.

10. The system of claim 1, wherein:
    the instructions, in being executable by the processor to make the map server operable to prepare the basic route, are executable by the processor to make the map server operable to:
        categorize each section of multiple sections of the basic route into one of a plurality of categories based on characteristics of the wireless communications network associated with the section; and
    the instructions, in being executable by the processor to make the map server operable to prepare the tailored route, are executable by the processor to make the map server operable to:
        prepare the tailored route to include more or less map data in places based on results of the categorizing by the map server processor.

11. A method for providing a tailored route to a mobile communications device over a wireless communications network using a system including a map server, the method comprising:

the map server preparing a basic route from a route origin to a route destination;

the map server obtaining information regarding characteristics of the wireless communications network along the basic route;

the map server preparing the tailored route using the basic route and the network characteristics information; and the map server providing the tailored route to the mobile communications device over the wireless communications network.

12. The method of claim 11, further comprising:

the map server receiving a request from the mobile communications device by way of the wireless communications network; and the map server preparing the tailored route in response to the map server receiving the request from the mobile communications device.

13. The method of claim 11, wherein the system further includes an evaluation server and the method further comprises:

the evaluation server analyzing the wireless communications network and preparing data regarding conditions of the wireless communications network;

wherein the map server obtains at least some of the information regarding characteristics of the wireless communications network from the data prepared by the evaluation server.

14. The method of claim 11, wherein:

the map server, in providing the tailored route to the mobile communications device over the wireless communications network, provides the tailored route to the mobile communications device in a format enabling the mobile communications device to present the tailored route to a user of the mobile communications device as textual directions and/or as audible directions.

15. The method of claim 11, wherein:

the map server providing the tailored route to the mobile communications device includes:

identifying multiple parts of the tailored route to be provided separately;

identifying a condition precedent to sending a subsequent part of the multiple parts of the tailored route to the mobile communications device;

providing an initial part of the multiple parts of the tailored route to the mobile communications device;

determining that the condition precedent has been met; and providing the subsequent part of the tailored route to the mobile communications device in response to determining that the condition precedent has been met.

16. The method of claim 15, wherein:

the condition is the mobile communications device moving into a portion of the wireless communications network having or expected to have better network coverage and/or load characteristics than a portion of the wireless communications network in which the mobile communications device was in when the initial part of the tailored route was provided to the mobile communications device.

17. The method of claim 16, wherein:

the map server, in preparing the basic route from the origin to the destination, prepares a strict route including only the path of the basic route.

18. The method of claim 17, wherein:

the map server, in preparing the basic route from the origin to the destination, prepares the strict route and first level extra map data adjacent the strict route to accommodate potential re-routing in the event of a detour from the strict route by the mobile communications device.

19. The method of claim 18 wherein:

the map server, in preparing the tailored route:

determines an amount of second level route data to add to the first level extra map data of the basic route adjacent a portion of the route determined to be weak; and/or determines an amount by which to reduce the first level extra map data of the basic route adjacent a portion of the route determined to be strong.

20. The method of claim 11 wherein:

the map server, in preparing the basic route, categorizes each section of multiple sections of the basic route into one of a plurality of categories based on characteristics of the wireless communications network associated with the section; and the map server, in preparing the tailored route, prepares the tailored route to include more or less map data in places based on results of the categorizing by the map server in the preparing step.

* * * * *